United States Patent [19]
Teshirogi et al.

[11] Patent Number: 5,835,463
[45] Date of Patent: Nov. 10, 1998

[54] SPINDLE MOTOR CONTROL SYSTEM FOR USE IN AN OPTICAL DISK PLAYER

[75] Inventors: Kazuhiro Teshirogi, Neyagawa; Masanobu Shimizu, Hirakata; Katsutoshi Sumida, Katano, all of Japan

[73] Assignee: Matsushita Electric Industrial Co., Ltd., Kadoma, Japan

[21] Appl. No.: 800,179

[22] Filed: Feb. 13, 1997

[30] Foreign Application Priority Data

Feb. 15, 1996 [JP] Japan ................................. 8-027539

[51] Int. Cl.⁶ ...................................................... G11B 5/09
[52] U.S. Cl. .............................................. 369/50; 388/815
[58] Field of Search .................................. 369/50, 59, 32, 369/124; 388/815, 902, 907.5, 908, 906, 811, 812

[56] References Cited

U.S. PATENT DOCUMENTS

| | | |
|---|---|---|
| 4,710,827 | 12/1987 | Okita . |
| 4,727,530 | 2/1988 | Tomisawa . |
| 4,866,695 | 9/1989 | Suzuki et al. . |
| 5,243,587 | 9/1993 | Itoh et al. ................................. 369/50 |
| 5,377,295 | 12/1994 | Ueda et al. ............................... 388/815 |
| 5,420,841 | 5/1995 | Hwang ....................................... 369/50 |
| 5,590,105 | 12/1996 | Enami et al. ............................. 369/50 |
| 5,666,341 | 9/1997 | Horibe et al. ............................. 369/59 |

FOREIGN PATENT DOCUMENTS 5-109182  4/1993  Japan .

Primary Examiner—Tan Dinh
Attorney, Agent, or Firm—Greenblum & Bernstein, P.L.C.

[57] ABSTRACT

In the case where a CPS unit (9) detects a period of clock components of reproduction data to be within a given range, the spindle motor (8) is driven in the CLV mode in stable and the mean value or the low-frequency components of the drive signal data (Smd) during a given time period is stored in the memory unit (11), and in the meanwhile, when the clock components of the reproduction data can not be extracted, the spindle motor is driven in accordance with the mean value or low-frequency components stored in the memory unit. In the case where the reproduction data per se including the clock signal components for use in the CLV control is not obtained due to cracks and stains on the optical disk or due to external shock or vibrations applied from the outside, the stable rotation of the optical disk can be maintained for reproducing the data without causing undesirable burst rotation of the optical disk.

16 Claims, 12 Drawing Sheets

DIGITAL DATA

EDGE DETECTION

SYNC PATTERN

SPINDLE MOTOR CONTROL SYSTEM FOR USE IN AN OPTICAL DISK PLAYER

BACKGROUND OF THE INVENTION

1. Field of the Invention

The present invention relates to a spindle motor control system for controlling a spindle motor for rotating an optical disk at a constant linear velocity for use in an optical recording and/or reproducing apparatus, maintaining a data-reproducible rotation of a spindle motor even when reproduction data for controlling a constant linear velocity in rotating an optical disk is not obtained due to an off-track condition, noise and the like.

2. Description of the Prior Art

In a conventional optical recording/reproducing apparatus using an optical disk, there are widely used in a disk player, for example, a compact disk (CD), mini disk (MD) and the like, having a spiral recording track or concentric tracks formed thereon. In operating the disk player, in order to maintain a constant linear velocity (referred to as "CLV", hereinafter) in rotating an optical disk during a recording/reproducing operation, there has been employed a spindle motor servo-control system in the disk player for servo-controlling a spindle motor to obtain a rotation of the optical disk having a constant linear velocity (CLV), where the CLV control is performed based on periodic tracking servo digital data having a given period which the periodic data was previously recorded at a constant linear velocity along on a recording track or tracks formed on the optical disk.

The following briefly describes a general data format recorded on an optical disk in the case of using, for example, a compact disk having a spiral track along which periodic digital data is previously recorded in a CLV mode. This recorded digital data has durations each defined by a first transition and last transition from a leading edge to a trailing edge or vice versa, which each of the durations is limited to a predetermined range of, e.g., 3T to 11T assuming that T is a given reference period of, e.g., about 231 nano-sec (i.e., 4.3218 MHz) as shown in FIG. 11(a). Also, two pieces of the longest data having the maximum duration of 11T are continually recorded in accordance with a frame sync signal having a given frequency of e.g. 44.1 kHz. Accordingly, when the digital data is reproduced, the leading and trailing edges are detected to calculate the longest period as shown in FIG. 11(b). Thus, the spindle motor is controlled to have a rotational speed so that the calculated longest period corresponds to the maximum duration of 11T (=nearly 2.55 μsec in this case), thereby obtaining a CLV control of the spindle motor.

FIG. 10 shows an example of a conventional servo-control system for controlling a drive of a spindle motor used in an optical disk player.

In FIG. 10, reference numeral 1 denotes an optical disk having periodic digital data recorded, which the recorded data including tracking servo digital data is reproduced through an optical head 2, and the reproduced data is amplified by an RF amplifier 3 which serves as a waveform rectifying means. The RF amplifier 3 rectifies the reproduced data in waveform to be suitable for digital signal processing by slicing the waveform at a predetermined slice level having a given duty rate as shown in FIG. 12(a).

Reference numeral 4 denotes a focus/tracking control unit for obtaining focus and tracking conditions of a light beam spot applied from the optical head 2 onto the optical disk. Reference numeral 5 denotes a clock extracting unit which serves as e.g. a longest period calculating means for obtaining a CLV of the optical disk by extracting a clock signal component among from the waveform-rectified reproduction data outputted from the RF amplifier 3 as shown in FIG. 12(b).

When the focus and tracking servo-controls are both normally effected, the longest period calculated in accordance with the extracted clock component is proportional to the rotational speed of the spindle motor and then the output of the clock extracting unit 5 is fed to a CLV control unit 6 which controls a spindle motor 8 in accordance with the extracted clock component, by generating a motor drive signal so that the data of the longest period is coincident with the given longest period (11T in the above case) with reference to a reference clock generated by a reference clock generator (not shown). Thus, the drive signal outputted from the CLV control unit 6 is applied to the spindle motor via a loop filter (not shown) and a driver (not shown), so that the spindle motor 8 is driven in accordance with the drive signal to thereby rotate the optical disk under a CLV control mode.

Whereas, when a light spot from the optical head is in an off-track condition due to such as undesirable external shock or vibration, the slice level can not follow the variation in DC component of the applied signal in the RF amplifier 3, resulting in causing burst in rotation of the spindle motor.

In order to avoid this undesirable rotation, an off-track detection unit 13 is provided in parallel to the clock extracting unit 5 so that a switch 14 is switched off to cut off the transmission of the spindle motor drive signal in a CLV servo-control loop. In more detail, the off-track detection unit 13 receives the output of the RF amplifier 3 to detect the off-track condition of the light spot, and the output of the off-track detection unit 13 is applied to a control input terminal of the switch 14 so that the switch 14 is switched on/off of the transmission of the drive signal outputted from the CLV control unit 6 to the spindle motor 8, in accordance with the detection result detected by the off-track detection unit 13 as shown in FIGS. 12(c) and 12(d).

By this conventional arrangement, when the light spot applied from the optical head 2 is in a state of an off-track condition on the optical disk 1, the off-track condition is detected by the off-track detection unit 13, and the switch 14 is then switched off based on the detection result outputted from the off-track detection unit 13 to thereby cut off the transmission of the drive signal outputted from the CLV control unit 6 so that the spindle motor is rotated only by its inertia, thereby preventing the burst rotation of the spindle motor.

In this conventional arrangement, however, when the reproduction data per se is not obtained in the recording/reproducing operation due to cracks and stains on the optical disk or due to external shock or vibrations applied from the outside, the clock signal component can not be extracted and the CLV control can not be effected, resulting in causing undesirable burst rotation of the optical disk in some cases.

Moreover, in the optical disk player, it is essentially required to maintain a rotational speed of the spindle motor sufficient to effect a recording/reproducing operation in stable during the operation. In view of this requirement, however, there has been further involved a problem in the conventional system such that the CLV control in rotation of the optical disk can not be maintained because the CLV servo-control loop is switched off.

SUMMARY OF THE INVENTION

The present invention has been developed with a view to substantially solving the above described disadvantages.

Accordingly, an essential objective of the present invention is therefore to provide a spindle motor control system for maintaining a rotational speed of a CLV sufficient to reproduce data while preventing occurrence of burst rotation even when an off-track condition is caused.

In order to achieve the above objective, according to the present invention, a spindle motor control system controlling a spindle motor for rotating an optical disk at a constant linear velocity for recording/reproducing data comprises: a clock extracting unit which extracts clock components among from the reproduction data; a constant linear velocity control unit which generates a drive signal (Smd) for controlling the spindle motor in accordance with the extracted clock components to thereby rotate the optical disk in a constant linear velocity mode; a clock period supervisory unit for judging whether or not a clock period of the reproduced data is within a given range and the remaining time interval is more than a predetermined value; and a memory unit for holding a mean value of the drive signal at a predetermined time intervals when the extracted clock component has a period within the given range and the remaining time thereof is more than a predetermined value.

The spindle motor control system further comprises a changeover switching unit which is switched between the first and second connections thereof in accordance with the judgment by the clock period supervisory unit, where the first connection is for selecting the output of the constant linear velocity control unit when the extracted clock component has a period within the given range while the second connection is for selecting the output of the memory unit otherwise, and any one of the outputs is selectively connected in the changeover switching unit to be applied to the spindle motor.

Moreover, the spindle motor control system of the present invention further comprises a drive signal supervisory unit for judging whether or not the level of the spindle motor drive signal is beyond a given range and whether or not the remaining time period thereof is over a predetermined time interval.

Furthermore, in the present invention, a spindle motor control method controlling a spindle motor for rotating an optical disk at a constant linear velocity for recording/ reproducing data comprises the steps of: extracting a clock component signal among from reproduction data; judging whether or not the period of the extracted clock component signal is within a given range during a time interval larger than a predetermined time period, thereafter generating the clock period judgment signal; and when the period of the extracted clock component signal is within the given range in the judging step, comprising the steps of performing a constant linear velocity control calculation, and then selectively connecting the spindle motor drive signal to the spindle motor; and then calculating any one of the mean value or low frequency components of the spindle motor drive signals during a given time period and holding the calculated mean value or low frequency components in the memory section, renewing the output of the averaging section, whereas, when the period of the extracted clock component signal is beyond the given range during the time interval larger than the predetermined time period in the judging step, comprising the steps of reading out the mean value or low frequency components stored last in the memory process and transmitting to the spindle motor by selecting connection of the memory section side.

In addition, in the spindle motor control method of the present invention, in the case where the reproduction data including the clock signal components for use in the constant linear velocity control is not obtained or in the case where it is hard to decide whether the clock components of the reproduction data is within or beyond the given range over the predetermined time period, the method comprises the steps of judging that the spindle motor drive signal outputted from the constant linear velocity control process is beyond the given range over the predetermined time interval, so that the spindle motor is rotated in accordance with any one of the mean value or the low-frequency components thereof which was last stored in the memory process under the constant linear velocity control mode.

Therefore, according to the first aspect of the present invention, when the spindle motor is driven in the CLV mode in stable, the mean value or the low-frequency components of the drive signal data during a given time period is stored in the memory unit at predetermined time intervals, and in the meanwhile, when the clock components of the reproduction data can not be extracted, the spindle motor is driven in accordance with the mean value or low-frequency components stored in the memory unit.

By this arrangement, even in the case where the reproduction data per se including the clock signal components for use in the CLV control is not obtained due to cracks and stains on the optical disk or due to external shock or vibrations applied from the outside, the stable rotation of the optical disk can be maintained for reproducing the data without causing undesirable burst rotation of the optical disk.

Further according to the second aspect of the present invention, even in the case where the reproduction data per se including the clock signal components for use in the CLV control is not obtained due to cracks and stains on the optical disk or due to external shock or vibrations applied from the outside, or even in the case where it is hard for the clock period supervisory unit to decide whether the clock components of the reproduction data is within or beyond the given range over the predetermined time period, the drive signal supervisory unit judges that the spindle motor drive signal is beyond the given range over the predetermined time interval, so that the spindle motor can be rotated in accordance with the mean value or the low-frequency components thereof which was last stored in the memory unit under the CLV control mode, so that the spindle motor can be stably rotated maintaining a CLV in rotating the optical disk.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
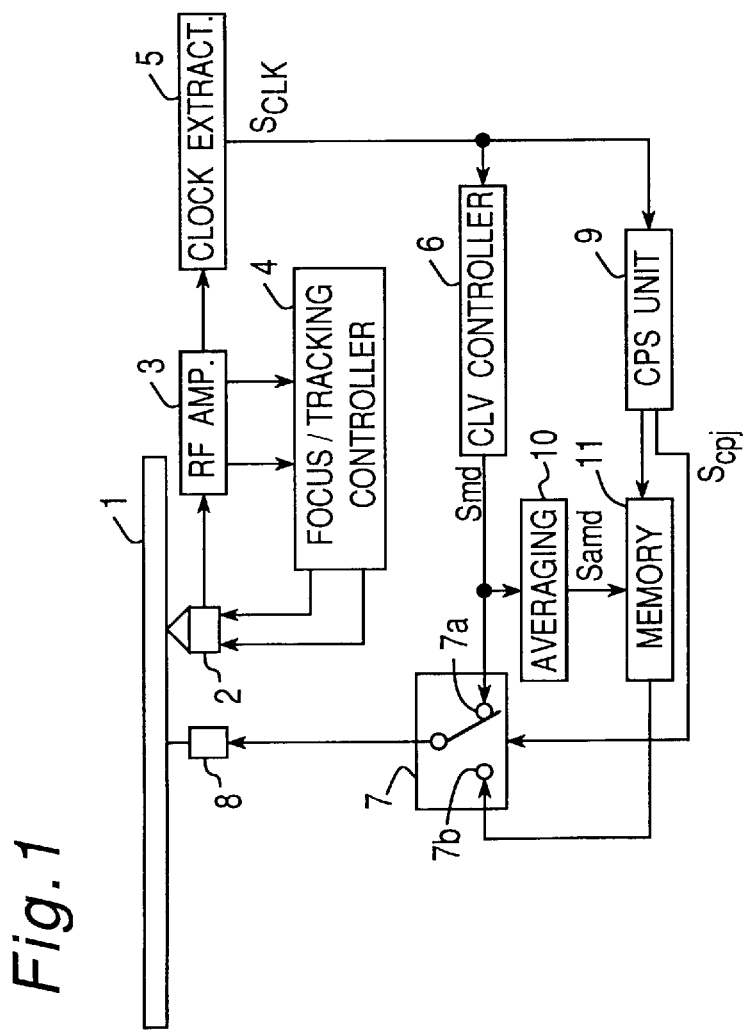
FIG. 1 is a block diagram showing a construction of a spindle motor control system according to a first embodiment of the present invention.

Before the description proceeds, it is to be noted that, since the basic structures of the preferred embodiments are in common to the conventional one, like parts are designated by the same reference numerals throughout the accompanying drawings.

Hereinbelow, a first preferred embodiment of the present invention is described with reference to FIGS. 1 through 5.

In FIG. 1, reference numeral 1 denotes an optical disk from which previously recorded data is reproduced through an optical head 2 while rotation of the optical disk is maintained by a spindle motor 8. The reproduced data is fed to a waveform rectifying unit 3 which is comprised of e.g. a RF amplifier where the data is rectified in waveform through amplification. The RF amplifier 3 also generates a focus error signal and tracking error signal, which the error signals are fed to a focus/tracking control unit 4. The focus/tracking control unit 4 controls a focus/tracking of a light beam spot applied from the optical head 2, based on the focus error and tracking error signals outputted from the RF amplifier 3. The optical disk 1, optical head 2, RF amplifier 3, and focus/tracking control unit 4 constitute a focus/tracking servo-control loop circuit.

Reference numeral 5 denotes a clock extracting unit which receives the waveform-rectified reproduction data outputted from the RF amplifier 3 and extracts clock components among from the waveform-rectified reproduction data. The clock extracting unit 5 is comprised of, for example, a PLL circuit. The extracted clock components outputted from the clock extracting unit 5 are fed in common to both a CLV control unit 6 and a clock period supervisory (CPS) unit 9.

The CLV control unit 6 is comprised of, for example, a filtering unit, outputting a spindle motor drive signal (Smd) which is fed to an averaging unit 10 and also fed to the spindle motor 8 via a changeover switching unit 7. The spindle motor 8 is controlled in accordance with the extracted clock components so that the extracted clock components have a period of a given reference clock with a sync pattern.

Thus, the spindle motor is driven in accordance with the drive signal outputted from the CLV control unit 6 to thereby rotate the optical disk in a CLV mode. In this arrangement, the optical disk 1, optical head 2, RF amplifier 3, clock extracting unit 5, CLV control unit 6 and spindle motor 8 constitute a CLV control loop circuit for obtaining the CLV mode.

Figure 2:
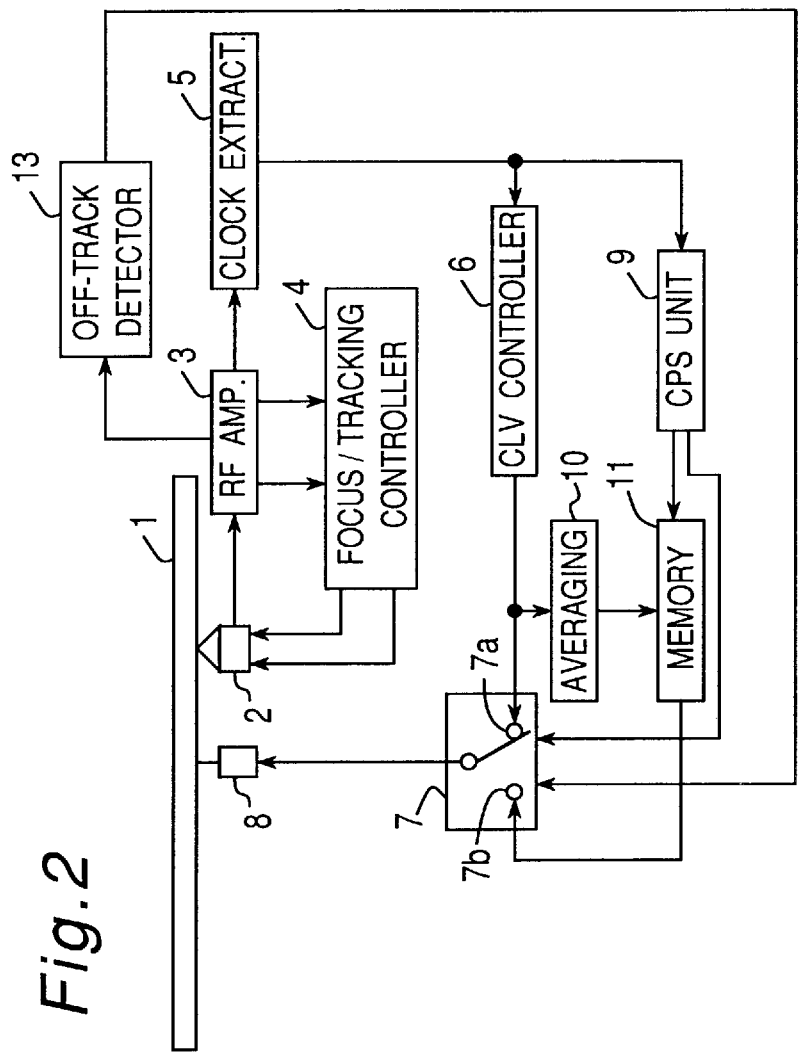
FIG. 2 is a block diagram showing a modified construction of the first embodiment.

In the spindle motor control system, in order to detect an off-track condition of the light beam spot, an off-track detection unit 13 may be provided in parallel to the clock extracting unit 5 as shown in FIG. 2, for directly controlling the changeover switching unit 7 in accordance with the detection result detected by the off-track detection unit 13.

Figure 3:
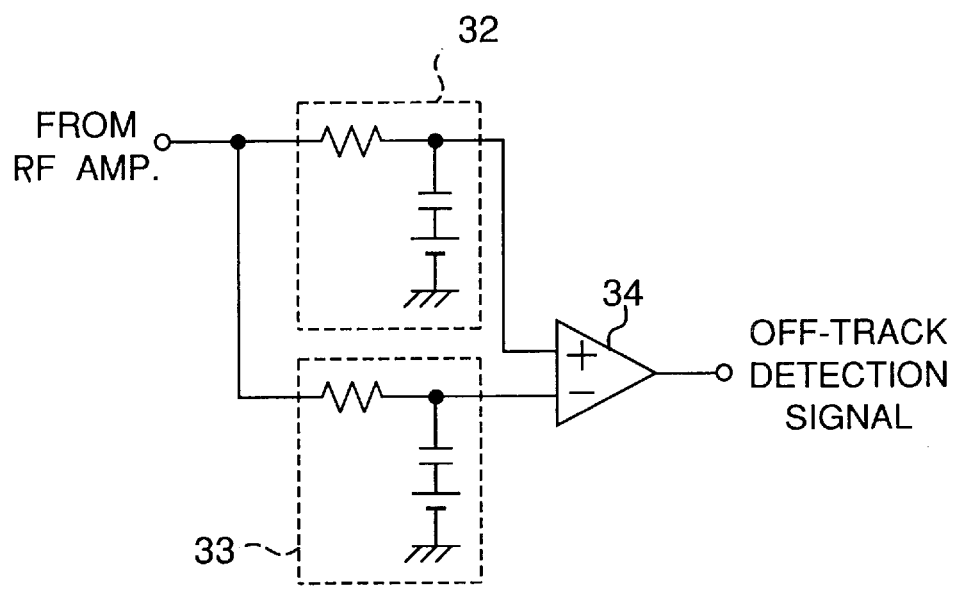
FIG. 3 is a circuit diagram showing a schematic construction of an off-track detection unit shown in FIG. 2.

FIG. 3 shows an example of a construction of the off-track detection unit 13, which is comprised of a comparator 34 and two detectors 32 and 33 having time constants different from each other with DC components appropriately adjusted. The detectors 32 and 33 receive the output of the RF amplifier 3, and the outputs of the two comparators are then compared in level by the comparator 14.

Thus, the output of the off-track detection unit 13 is applied to a control input terminal of the changeover switching unit 7 so that the switching unit 7 is changed over between the first and second terminals 7a and 7b so that the transmission of the drive signal outputted from the CLV control unit 6 to the spindle motor 8 is selectively controlled in accordance with the detection result detected by the off-track detection unit 13.

Referring back to FIG. 1, the clock period supervisory (CPS) unit 9 for judging a clock period of the reproduced data is comprised of counters, comparators and the like, which generates binary data of High and Low levels as a clock period judgment signal (Scpj), where the High level is generated when the extracted clock component has a period within a given range remaining during a time interval more than a predetermined value, while the Low level is generated in the other cases. The output of the clock period supervisory (CPS) unit 9 is operatively connected to both a memory unit 11 and the changeover switching unit 7.

In accordance with the output level of the CPS unit 9, the memory unit 11 holds the output of the averaging unit 10 when the High level output is generated by the CPS unit 9, namely, when the extracted clock component has a period within the given range remaining for more than a predetermined time interval.

The changeover switching unit 7 is switched between the first and second terminals 7a and 7b thereof in accordance with the output level of the CPS unit 9, where the first terminal 7a is for selecting the output of the CLV control unit 6 while the second terminal 7b is for selecting the output of the memory unit 11, and any one of the outputs is selectively connected in the changeover switching unit 7 to be applied to the spindle motor 8 via a Digital/Analogue converter (not shown) and via a driver unit (not shown).

Figure 4:
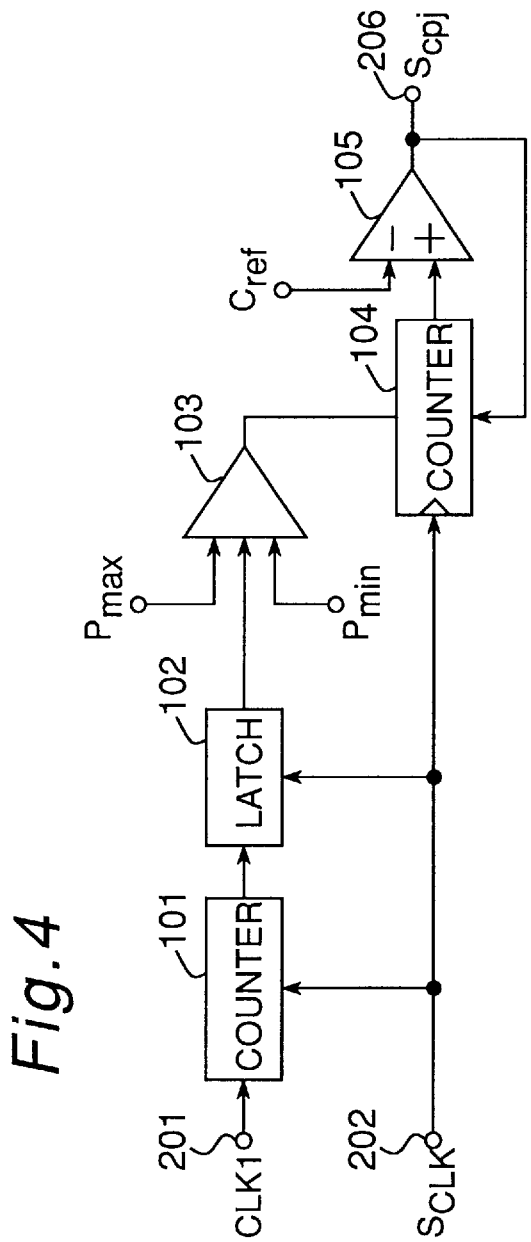
FIG. 4 is a block diagram showing a construction of a clock period monitoring unit used in the first embodiment shown in FIG. 1.

FIG. 4 shows an example of a construction of the CPS unit 9.

In FIG. 4, reference numeral 101 denotes a first counter for counting the number of the periods of the clock components $S_{CLK}$ outputted from the clock extracting unit 5, based on a first reference clock signal CLK1 having a given sufficiently high frequency for performing the counting operation. Reference numeral 102 denotes a first latch unit in which the counted data fed from the first counter 101 is latched at the timing of the clock component signal $S_{CLK}$ of the reproduction data.

Reference numeral 103 denotes a window comparator for judging whether or not the level of the output data from the first latch unit 102 is within a range between Pmax representing the maximum period level and Pmin representing the minimum period level, where Pmax and Pmin levels are defined by a range of, e.g., ±10% of the mean value (e.g., 7.5 KHz in a mini disk for ROM). When the output level of the first latch unit 102 is within the range of Pmax and Pmin, the window comparator 103 generates an output of H level, and otherwise generates an output of L level, which the output of H or L level is applied to a second counter 104. When the output of the window comparator 103 is of H level, the count value counted in the second counter 104 is cleared up, and the output of the second counter 104 is fed to a comparator 105.

In the comparator 105, the output level of the second counter 104 is compared with a reference value (Cref) representing the minimum time interval. When the output level of the second counter 104 is smaller than the reference value (Cref), the comparator 105 outputs a L level signal, and otherwise outputs a H level signal. The L or H level signal outputted from the comparator 105 is fed back to the second counter 104, and the output of the comparator 105 is also generated from the CPS unit 9 as a clock period judgment signal Scpj. When the output of the comparator 105 is of L level, the second counter 104 receives this L level signal and counts the clock component signal $S_{CLK}$ of the reproduced data.

In other words, when the clock component signal $S_{CLK}$ level is within the range of Pmax and Pmin and the remaining period thereof is larger than the reference time interval (represented by Cref), the clock period judgment signal Scpj of H level is outputted from the CPS unit 9 to control the switching unit 7, turning off the first terminal 7a side and turning on the second terminal 7b side to receive the data stored in the memory unit 11, thereby maintaining a data-reproducible rotation of the spindle motor even in the abnormal condition in reproducing the digital data.

Referring back to FIG. 1, in the averaging unit 10 calculates a mean value of output signals each having a given period outputted from the CLV control unit 6, and then the memory unit 11 holds the output of the averaging unit 10.

Figure 5:
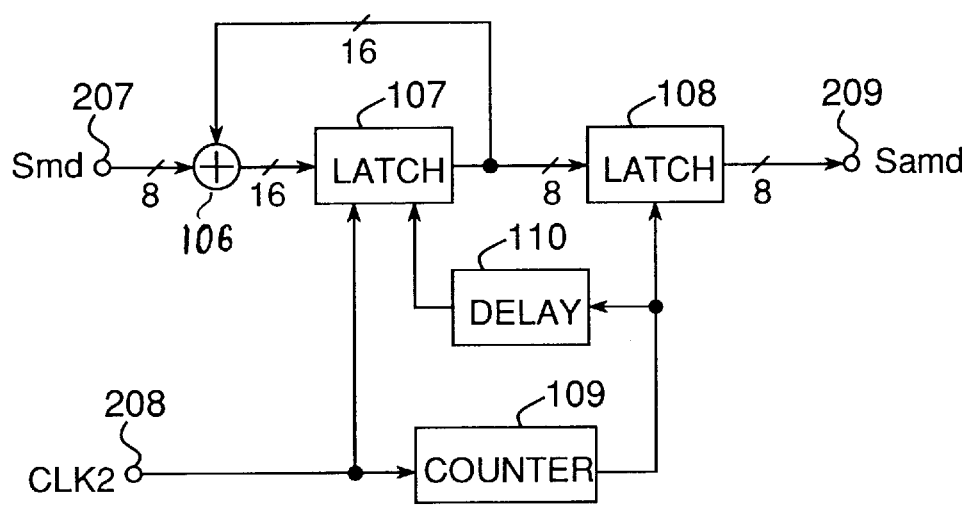
FIG. 5 is a block diagram showing a construction of an averaging unit used in the first embodiment shown in FIG. 1.

FIG. 5 shows an example of a construction of the averaging unit 10 which includes a first input terminal 207 for receiving a spindle motor drive signal Smd of 8 bit digital data generated by the CLV control unit 6 and includes an adder 106 and a second latch unit 107 having the output $S_{LT}$ thereof fed back to the adder 106, so that the drive signal Smd and the output $S_{LT}$ of the second latch unit 107 are added by the adder 106 to generate 16-bit data which is applied to the second latch unit 107. The second latch unit 107 holds the output of 16 bits fed from the adder 106 at time intervals of a given period of a given second clock signal CLK2 applied through a second input terminal 208 while the latched data held in the second latch unit 107 is cleared up based on the output of a delay unit 110, and then the output of the second latch unit 107 is partially applied to a third latch unit 108.

The averaging unit 10 further includes a third counter 109 comprised of an 8-bit counter which generates a pulse at a timing of every 256 countings of the second clock signal CLK2, which the generated pulse is applied to both the third latch unit 108 and the delay unit 110 for delaying the applied pulse. The third latch unit 108 holds the high-order 8 bit data among from the 16 bit data $S_{LT}$ outputted from the second latch unit 107, at time intervals of the period of the output pulses of the third counter 109, and then generates an average drive signal Samd through an output terminal 209 of the averaging unit 10.

In other words, the average drive signal Samd indicates the mean value of the spindle motor drive signals (Smd) in a time period corresponding to the count value 256 of the second clock signal CLK2. Thus, the averaging unit 10 calculates a mean value of the spindle motor drive signals (Smd) generated by the CLV control unit 6 during the given period of 256 countings.

In a modified example, the averaging unit 10 may be comprised of a low-pass filter for reinforcing low frequency components of the output signals Smd generated by the CLV control unit 6 to calculate the low components of the output of the CLV control unit 6. The insertion of the low-pass filter can prevent any adverse influences on improving effects when D.C.-like torque disturbances occur, even if the bit length of a memory value of a memory unit is made shorter than the bit length of the rotation error of the drive control signal.

The following describes an operation of the first embodiment of the spindle motor control system according to the present invention.

Initially, the focus/tracking control is performed by the focus/tracking control loop comprised of the optical disk 1, optical head 2, RF amplifier 3 and focus/tracking control unit 4, while the CLV control is performed by the CLV control loop comprised of the optical disk 1, optical head 2, RF amplifier 3, clock extracting unit 5, CLV control unit 6 and spindle motor 8.

In the CLV control mode, the first terminal 7a of the changeover switching unit 7 is usually selected on so that the spindle motor drive signal Smd outputted from the CLV control unit 6 is transmitted to the spindle motor 8.

Firstly, the clock component signal $S_{CLK}$ is extracted by the clock extracting unit 5 among from the reproduction data rectified in waveform by the RF amplifier 3. Then, it is judged by the CPS unit 9 whether or not the period of the extracted clock component signal $S_{CLK}$ is within a given range and the remaining time interval thereof is larger than a predetermined time period, thereby generating the clock period judgment signal Scpj.

If detection result is within the given range, the CLV control calculation is performed by the CLV control unit 6, and then the spindle motor drive signal Smd generated by the CLV control unit 6 is transmitted to the spindle motor 8 by selecting the connection of the first terminal 7a in the changeover switching unit 7. In the meanwhile, the mean value of the spindle motor drive signals Smd generated by the CLV control unit 6 during a given time period is calculated by the averaging unit 10 and the calculated mean value is held in the memory unit 11, renewing the output of the averaging unit 10.

If the judgment of the CPS unit 9 is beyond the given range over the predetermined time interval, the mean value stored last in the memory unit 11 is read out at this time and transmitted to the spindle motor 8 by selecting connection of the second terminal 7b in the changeover switching unit 7.

In more detail, in the case where the reproduction data per se including the clock signal components for use in the CLV control is not obtained in the recording/reproducing operation due to cracks and stains on the optical disk or due to external shock or vibrations applied from the outside, the CPS unit 9 first detects that the level of the clock components of the reproduction data transmitted from the clock extracting unit 5 is beyond the given range of Pmax and Pmin. Then, the memory unit 11 stops the renewal of holding the mean value Samd outputted from the averaging unit 10 and the memory unit 11 outputs the last stored data which was held immediately before the level of the clock components was beyond the given range. At the same time, the changeover switching unit 7 is changed over from the first terminal 7a to the second terminal 7b, by selecting the second terminal 7b side for connecting the output of the memory unit 11 while opening the first terminal 7a side, turning off the transmission from the output Smd of the CLV control unit 6.

Thus, even when the clock signal components of the reproduction data can not be extracted by the clock extracting unit 5, the spindle motor can be rotated in accordance with the mean value Samd or the low-frequency components thereof which was last stored in the memory unit 11 under the CLV control mode, so that the spindle motor can be stably rotated with high accuracy maintaining a CLV in rotating the optical disk.

As described above, according to the first embodiment of the present invention, when the spindle motor 8 is driven in the CLV mode in stable, the mean value or the low-frequency components of the drive signal data Smd during a given time period is stored in the memory unit 11 at predetermined time intervals, and in the meanwhile, when the clock components of the reproduction data can not be extracted, the spindle motor is driven in accordance with the mean value or low-frequency components stored in the memory unit.

By this arrangement, even in the case where the reproduction data per se including the clock signal components for use in the CLV control is not obtained due to cracks and stains on the optical disk or due to external shock or vibrations applied from the outside, the stable rotation of the optical disk can be maintained for reproducing the data without causing undesirable burst rotation of the optical disk.

SECOND EMBODIMENT

Figure 6:
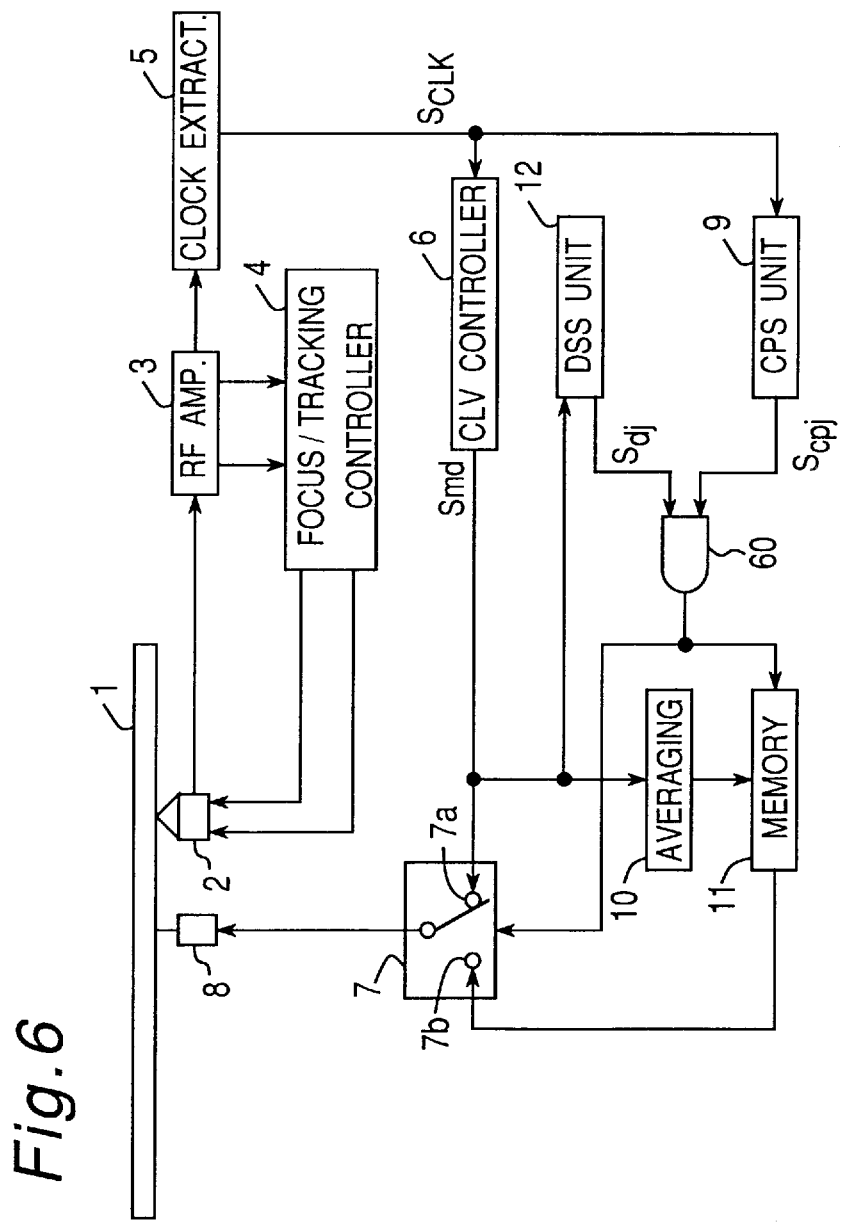
FIG. 6 is a block diagram showing a construction of a spindle motor control system according to a second embodiment of the present invention.
Figure 7:
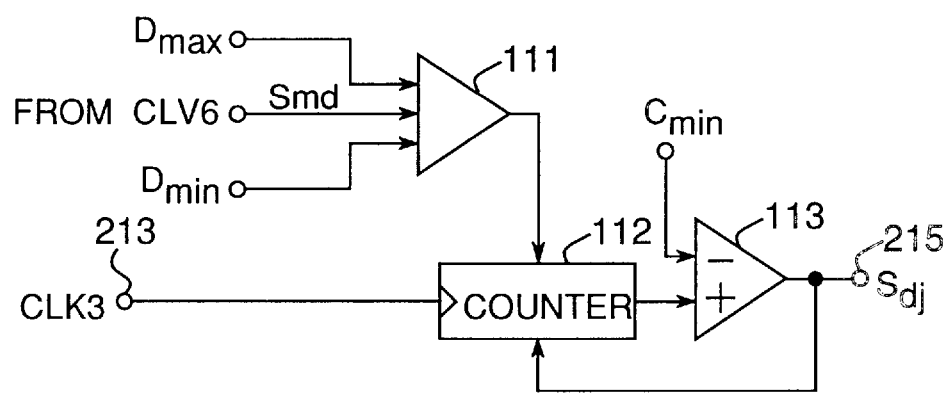
FIG. 7 is a block diagram showing a construction of a drive signal monitoring unit used in the second embodiment shown in FIG. 6.
Figure 9:
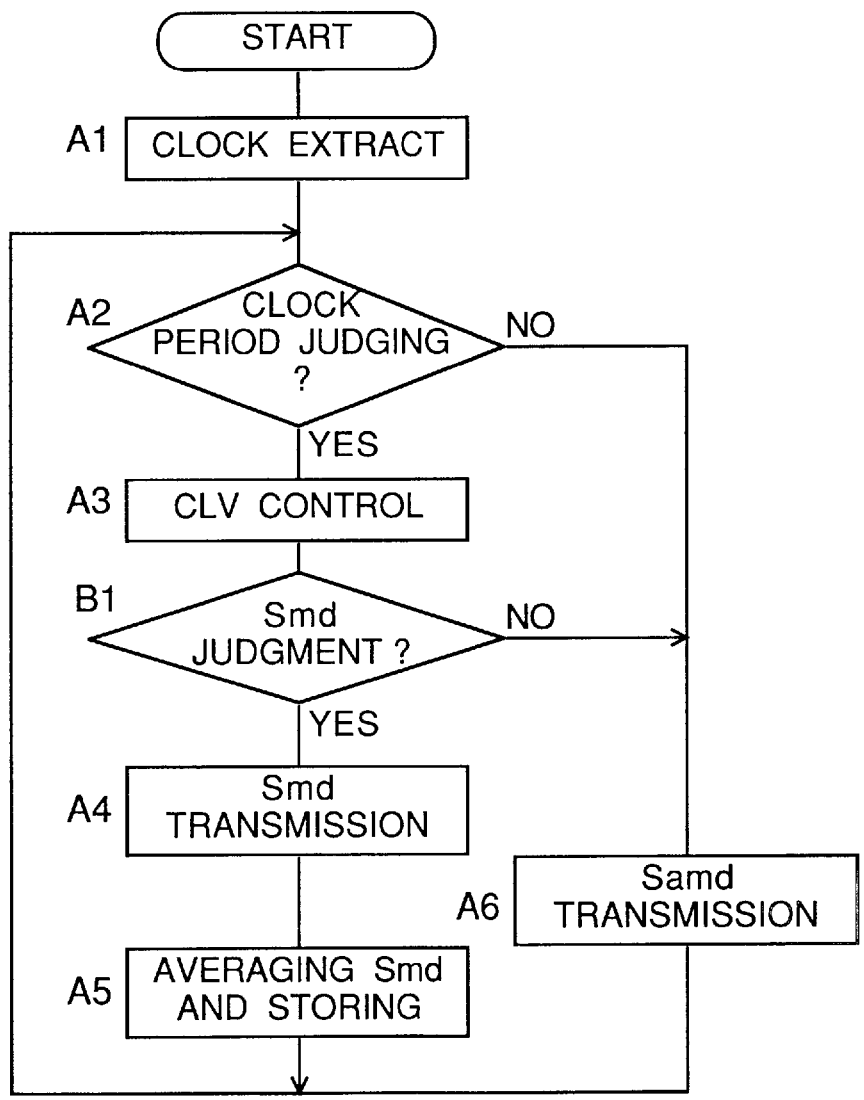
FIG. 9 is a flow chart explaining an operation of the second embodiment of the present invention.
Figure 10:
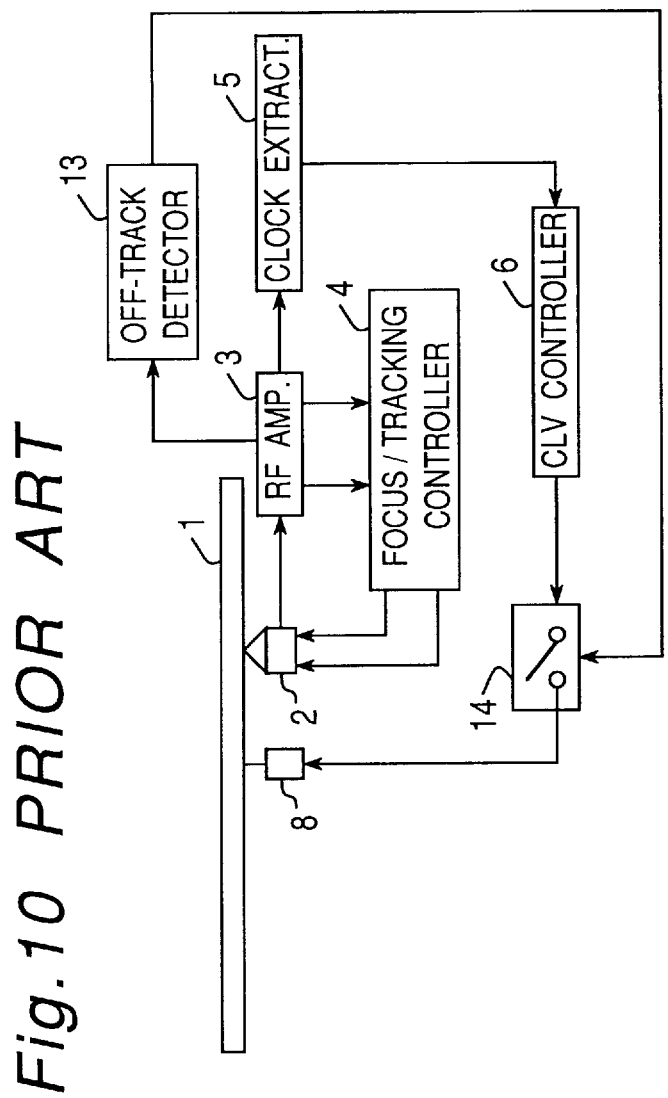
FIG. 10 is a block diagram showing a construction of a conventional spindle motor control system.
Figure 11A:
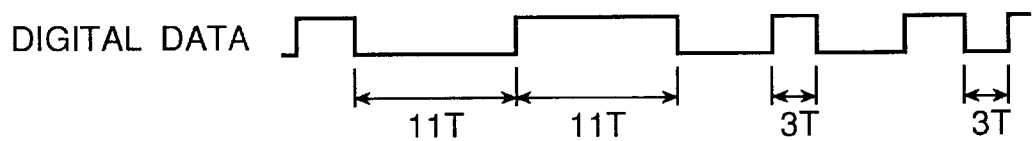
FIGS. 11(a) and 11(b) are timing charts showing durations of the recorded digital data format and leading/trailing edge detection thereof, respectively.
Figure 11B:
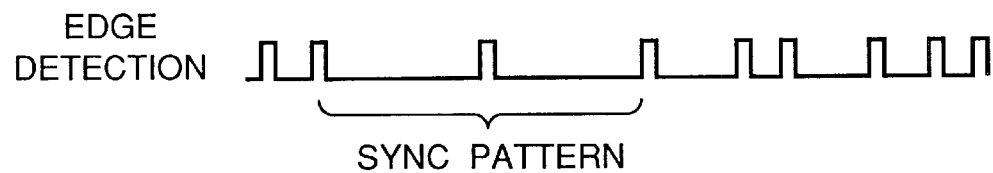
Figure 12A:
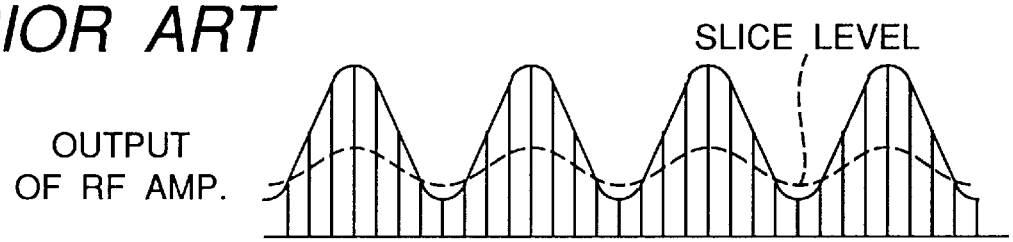
FIGS. 12(a), 12(b), 12(c) and 12(d) are timing charts showing the outputs of the RF amplifier 3 and clock extracting unit 5, respectively.
Figure 12B:
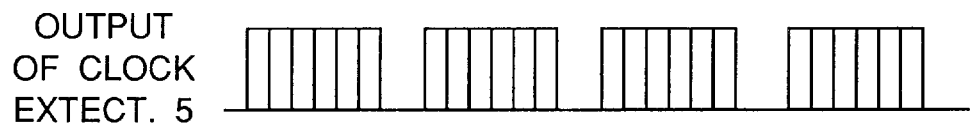
Figure 12C:
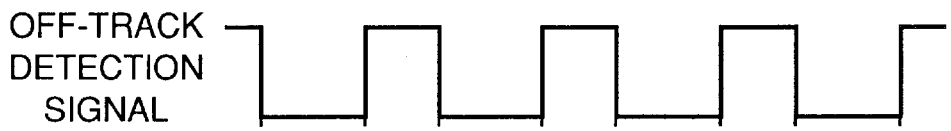
Figure 12D:
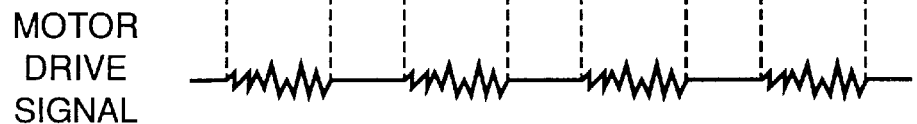

The following describes a second preferred embodiment of the spindle motor control system according to the present invention with reference to FIGS. 6, 7 and 9.

Since the basic structure of this embodiment is similar to that of the first embodiment except for providing a drive signal supervisory (DSS) unit 12 and a gate circuit (60), like parts are designated by the same reference numerals and the explanation of the redundant parts is omitted here.

FIG. 6 shows a construction of the second embodiment of the spindle motor control system in which the drive signal supervisory unit (referred to as "DSS unit" hereinafter) 12 is provided for receiving the spindle motor drive signal Smd outputted from the CLV unit 6. In the DSS unit 12, it is judged whether or not the level of the drive signal Smd is beyond a given range and whether or not the remaining time period thereof is over a predetermined time interval. When the level of the drive signal is beyond the given range over the predetermined time interval, the DSS unit 12 outputs a L level signal, and otherwise, outputs a H level. The outputs of the DSS unit 12 and the CPS unit 9 are both applied to the gate unit 60 which outputs a L level signal when any one of the outputs of the DSS unit 12 and the CPS unit 9 is of L level.

FIG. 7 shows an example of a construction of the DSS unit 12 which is comprised of a window comparator 111, a fourth counter 112, and a comparator 113. The spindle motor drive signal Smd outputted from the CLV control unit 6 is applied to the comparator 111 through a first input terminal 207 and the applied signal Smd is compared with the given values Dmax and Dmin, where Dmax represents the maximum limit of the drive signal level and Dmin represents the minimum limit thereof.

When the level of the applied signal Smd is in the given range of Dmax and Dmin, the comparator 111 outputs a H level signal, and otherwise outputs L level signal, which the outputs are applied to the fourth counter 112. When the output of the comparator 111 is of L level, the count value counted by the fourth counter 112 is cleared up, which the output of the fourth counter 112 is applied to the comparator 113 for comparing the counted value with a given value Cmin which represents the minimum limit of the time interval.

When the count value outputted from the fourth counter 112 is smaller than the given value Cmin, the comparator 113 outputs a L level signal, and otherwise outputs a H level signal. The output signal of the comparator 113 is fed back to the fourth counter 112, and the output of the comparator 113 is also generated through an output terminal 215 of the DSS unit 12 as a drive signal judgment signal Sdj.

When the output level of the fourth counter 112 is below the given value Cmin, the comparator 113 generates a L level signal, and otherwise outputs a H level signal. When the L level output from the comparator 113 is fed back to the fourth counter 112, the fourth counter 112 advances the counting operation based on a third clock signal having a predetermined frequency for counting operation applied via a second input terminal 213. In other words, when the level of the spindle motor drive signal Smd is within the given range of Dmax and Dmin and the remaining period thereof is larger than the given value Cmin, the DSS unit 12 generates a H level signal as the drive signal judgment signal Sdj.

Thus, it is decided based on the drive signal judgment signal Sdj whether or not the spindle motor drive signal Smd is beyond the given range over the predetermined time interval.

The following describes the operation of the spindle motor control system of the second embodiment.

Initially, in the case where the CLV control is stably performed, the operation thereof is similar to that of the first embodiment, and the redundant explanation thereof is omitted here for brief.

In the case where the reproduction data per se including the clock signal components for use in the CLV control is not obtained due to cracks and stains on the optical disk or due to external shock or vibrations applied from the outside, the CPS unit 9 first detects that the level of the clock components of the reproduction data transmitted from the clock extracting unit 5 is beyond the given range of Pmax and Pmin. Then, the memory unit 11 stops the renewal of holding the mean value Samd outputted from the averaging unit 10 and the memory unit 11 outputs the last stored data which was held immediately before the level of the clock components was beyond the given range. At the same time, the changeover switching unit 7 is changed over by selecting the second terminal 7b side for connecting the output of the memory unit 11 while opening the first terminal 7a side, turning off the transmission from the output Smd of the CLV control unit 6, which the operation is similar to that of the first embodiment.

In the case where it is hard to decide in the CPS unit 9 whether the period level of the clock components is within or beyond the given range due to noises or the like applied to the reproduction data, the DSS unit 12 judges that the spindle motor drive signal Smd outputted from the CLV control unit 6 is beyond the given range over the predetermined time interval, and then the drive signal judgment signal Sdj is applied to the gate circuit 60, so that the spindle motor can be rotated in accordance with the mean value Samd or the low-frequency components thereof which was last stored in the memory unit 11 under the CLV control mode, so that the spindle motor can be stably rotated maintaining a CLV in rotating the optical disk.

In the case where the DSS unit 12 judges that the level of the spindle motor drive signal Smd is not beyond the given range over the predetermined time interval, the stable rotation of the optical disk can be maintained for reproducing the data without causing undesirable burst rotation of the optical disk.

As described above, according to the second embodiment, when the spindle motor 8 is driven in the CLV mode in stable, the mean value or the low-frequency components of the drive signal data Smd during a given time period is stored in the memory unit 11 at predetermined time intervals, and in the meanwhile, when the clock components of the reproduction data can not be extracted, the spindle motor is driven in accordance with the mean value or low-frequency components stored in the memory unit.

Moreover, even in the case where the reproduction data per se including the clock signal components for use in the CLV control is not obtained due to cracks and stains on the optical disk or due to external shock or vibrations applied from the outside, or even in the case where it is hard for the CPS 9 unit to decide whether the clock components of the reproduction data is within or beyond the given range over the predetermined time period, the DSS unit 12 judges that the spindle motor drive signal Smd outputted from the CLV control unit 6 is beyond the given range over the predetermined time interval, so that the spindle motor can be rotated in accordance with the mean value Samd or the low-frequency components thereof which was last stored in the memory unit 11 under the CLV control mode, so that the spindle motor can be stably rotated with high accuracy maintaining a CLV in rotating the optical disk.

It is noted here that the constructions of the CPS unit 9, averaging unit 10, and DSS unit 12 in the present embodiments are merely shown by way of example and also the number thereof is not limited to those recited here. Moreover, in the present embodiments, although the period of the extracted clock components outputted from the clock extracting unit 5 is detected, the frequency thereof may be detected.

Furthermore, in the present embodiments, although the clock extracting unit 5, CLV control unit 6, CPS unit 9, averaging unit 10, DSS unit 12 and the like are individually constructed by way of circuitry arrangement, these constructions can be realized by way of a soft ware of a microcomputer.

Figure 8:
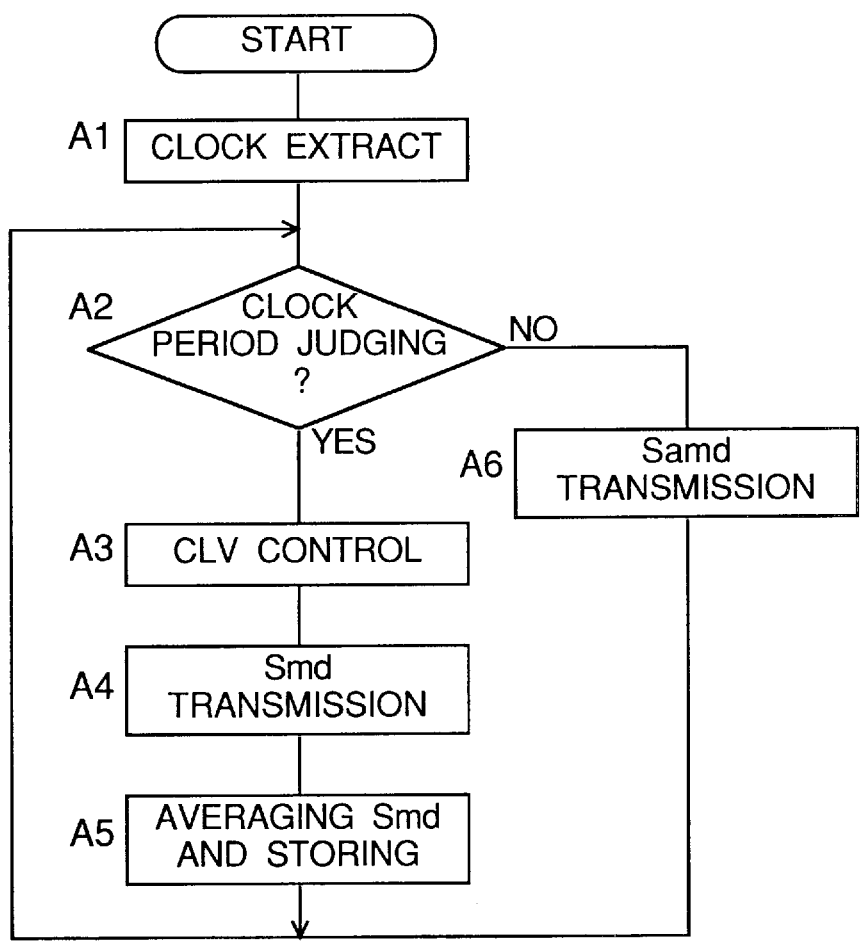
FIG. 8 is a flow chart explaining an operation of the first embodiment of the present invention.

The following describes an operation of the first embodiment of the spindle motor control system using a soft ware of a microcomputer with reference to a flow chart shown in FIG. 8.

Initially, the focus/tracking control is performed, while the CLV control is performed by the CLV control loop process.

In the first step A1, the clock component signal $S_{CLK}$ is extracted among from the reproduction data rectified in waveform by RF amplification. Then, in the step A2 it is judged whether or not the period of the extracted clock component signal $S_{CLK}$ is within a given range during a time interval larger than a predetermined time period, thereby generating the clock period judgment signal Scpj.

If detection result is "Yes" in the step A2, the program is advanced to step A3 and the CLV control calculation is performed, and then in the step A4 the spindle motor drive signal Smd is transmitted to the spindle motor 8 by selecting the connection of the first terminal side (7a). In the meanwhile, in the step A5, the mean value of the spindle motor drive signals Smd during a given time period is calculated and the calculated mean value is held in the memory section (11), renewing the output of the averaging section.

If the judgment is "No" in the step A2, the program is advanced to the step A6 and the mean value stored last in the memory section is read out and transmitted to the spindle motor 8 by selecting connection of the second terminal side (7b).

The operation of the spindle motor control system of the second embodiment using a soft ware of a microcomputer is described below with reference to a flow chart shown in FIG. 9.

Initially, in the case where the CLV control is stably performed, the operation thereof is similar to that of the first embodiment, and the redundant explanation thereof is omitted here for brief with regard to steps A1 through A3.

In the case where the reproduction data per se including the clock signal components for use in the CLV control is not obtained due to cracks and stains on the optical disk or due to external shock or vibrations applied from the outside, it is first detected that the level of the clock components of the extracted reproduction data is beyond the given range of Pmax and Pmin ("NO" in step A2). Then, the memory section (11) stops the renewal of holding the mean value Samd and the memory section (11) outputs the last stored data which was held immediately before the level of the clock components was beyond the given range. At the same time, the changeover switching is changed over by selecting the second connection of the output of the memory section (11) while opening the first connection side, turning off the transmission from the output Smd, which the operation is similar to that of the first embodiment.

In the case where it is hard to decide in the CPS section (9) whether the period level of the clock components is within or beyond the given range due to noises or the like applied to the reproduction data, the DSS processing section (12) judges that the spindle motor drive signal Smd is beyond the given range over the predetermined time interval ("NO" in step B1), and then the drive signal judgment signal Sdj is applied to the gate processing section (60), so that the spindle motor can be rotated in accordance with the mean value Samd or the low-frequency components thereof which was last stored in the memory unit 11 under the CLV control mode in step A6, so that the spindle motor can be stably rotated with high accuracy maintaining a CLV in rotating the optical disk.

In the case where the DSS processing section (12) judges that the level of the spindle motor drive signal Smd is not beyond the given range over the predetermined time interval, the stable rotation of the optical disk can be maintained for reproducing the data without causing undesirable burst rotation of the optical disk.

As described above, according to the first embodiment, when the spindle motor 8 is driven in the CLV mode in stable, the mean value or the low-frequency components of the drive signal data Smd during a given time period is stored in the memory unit 11 at predetermined time intervals, and in the meanwhile, when the clock components of the reproduction data can not be extracted, the spindle motor is driven in accordance with the mean value or low-frequency components stored in the memory unit. By this arrangement, even in the case where the reproduction data per se including the clock signal components for use in the CLV control is not obtained due to cracks and stains on the optical disk or due to external shock or vibrations applied from the outside, the stable rotation of the optical disk can be maintained for reproducing the data without causing undesirable burst rotation of the optical disk.

Also, according to the second embodiment, even in the case where the reproduction data per se including the clock signal components for use in the CLV control is not obtained due to cracks and stains on the optical disk or due to external shock or vibrations applied from the outside, or even in the case where it is hard for the CPS 9 unit to decide whether the clock components of the reproduction data is within or beyond the given range over the predetermined time period, the DSS unit 12 judges that the spindle motor drive signal Smd outputted from the CLV control unit 6 is beyond the given range over the predetermined time interval, so that the spindle motor can be rotated in accordance with the mean value Samd or the low-frequency components thereof which was last stored in the memory unit 11 under the CLV control mode in step A6, so that the spindle motor can be stably rotated with high accuracy maintaining a CLV in rotating the optical disk.

What is claimed is:

1. A spindle motor control system controlling a spindle motor for rotating an optical disk at a constant linear velocity for recording/reproducing data comprising:

a clock extracting unit which extracts clock components from the reproduction data;

a constant linear velocity control unit which generates a drive signal for controlling the spindle motor in accordance with the extracted clock components to thereby rotate the optical disk in a constant linear velocity mode;

a clock period supervisory unit for judging whether or not a clock period of the reproduced data is within a given range and the remaining time interval thereof is more than a predetermined value; and a memory unit for holding a mean value of the drive signal at predetermined time intervals when the extracted clock component has a period within the given range and the remaining time thereof is more than a predetermined value.

2. The spindle motor control system as defined in claim 1, further comprising a changeover switching unit which is switched between the first and second connections thereof in accordance with the judgment by the clock period supervisory unit, where the first connection is for selecting the output of the constant linear velocity control unit when the extracted clock component has a period within the given range while the second connection is for selecting the output of the memory unit when the extracted clock component has a period not within the given range, and one of the outputs is selectively connected in the changeover switching unit to be applied to the spindle motor.

3. The spindle motor control system as defined in claim 1, further comprising an off-track detection unit for detecting an off-track condition of a light beam spot applied from the optical head, said off-track detection unit provided in parallel to the clock extracting unit for directly controlling the changeover switching unit.

4. The spindle motor control system as defined in claim 1, further comprising an averaging unit for calculating a mean value of the spindle motor drive signals each having a given period outputted from the contact linear velocity control unit, and the calculated mean value is stored in the memory unit.

5. The spindle motor control system as defined in claim 4, wherein the averaging unit is comprised of a low-pass filter for reinforcing low frequency components of the spindle motor drive signals generated by the CLV control unit to thereby calculate the low frequency components of the output of the CLV control unit.

6. The spindle motor control system as defined in claim 1, further comprising a drive signal supervisory unit for judging whether or not the level of the spindle motor drive signal is beyond a given range and whether or not the remaining time period thereof is over a predetermined time interval.

7. The spindle motor control system as defined in claim 6, wherein when the level of the spindle motor drive signal is beyond the given range over the predetermined time interval, the drive signal supervisory unit outputs an L level signal, and otherwise, outputs a H level signal, and the outputs of the drive signal supervisory unit and the clock period supervisory unit are both applied to a gate unit.

8. A spindle motor control method controlling a spindle motor for rotating an optical disc at a constant linear velocity for recording/reproducing data, the method comprising:

extracting a clock component signal from the reproduction data;

judging whether or not the period of the extracted clock component signal is within a given range during a time interval larger than a predetermined time interval, then generating the clock period judgment signal;

when the period of the extracted clock component signal is within the given range in the judging step, performing a constant linear velocity control population, and then selectively connecting the spindle motor drive signal to the spindle motor; and then calculating one of the mean value and the low frequency components of the spindle motor drive signals during a given time period and holding the calculated mean value in a memory section, renewing the output of the averaging section, whereas, when the period of the extracted clock component signal is beyond the given range during the time interval larger than the predetermined time period in the judging step, reading out the mean value stored last in the memory section and transmitted to the spindle motor by selecting connection of the memory section side.

9. The spindle motor control method as defined in claim 8, wherein when the reproduction data including the clock signal components for use in the constant linear velocity control is not obtained or in the case where it is hard to decide whether the clock component of the reproduction data is within or beyond the given range over the predetermined time period, the method comprises judging that the spindle motor drive signal outputted from the constant linear velocity control process is beyond the given range over the predetermined time interval, so that the spindle motor is rotated in accordance with one of the mean value and the low frequency components thereof which was last stored in the memory section under the constant linear velocity control mode.

10. A spindle motor control system controlling a spindle motor for rotating an optical disk at a constant linear velocity for recording/reproducing data, said system comprising:

a clock extracting unit which extracts clock components from the reproduction data;

a constant linear velocity control unit which generates a drive signal for controlling the spindle motor in accordance with the extracted clock components to thereby rotate the optical disk in a constant linear velocity mode; and a clock component supervisory unit for judging whether or not a clock component of the reproduced data is within a given range and the remaining time interval thereof is more than a predetermined value, wherein a value of the drive signal is stored for a predetermined time interval when the extracted clock component is within the given range and the remaining time thereof is more than the predetermined value.

11. The spindle motor control system as defined in claim 10, wherein the clock component judged by said clock component supervisory unit is a clock period of the reproduced data.

12. The spindle motor control system as defined in claim 10, wherein the clock component judged by said clock component supervisory unit is a clock frequency of the reproduced data.

13. The spindle motor control system as defined in claim 10, further comprising a memory unit for storing a value of the drive signal at a predetermined time interval when the extracted clock component has a period within the given range and the remaining time thereof is more than a predetermined value.

14. The spindle motor control system as defined in claim 13, wherein said memory unit stores a mean value of the drive signal at a predetermined time interval.

15. The spindle motor control system as defined in claim 13, wherein said memory unit stores a low frequency component value of the drive signal at a predetermined time interval.

16. The spindle motor control system as defined in claim 10, wherein said clock extracting unit, said constant linear velocity control unit and said clock component supervisory unit are embodied in software for a microcomputer.

* * * * *

UNITED STATES PATENT AND TRADEMARK OFFICE
CERTIFICATE OF CORRECTION

PATENT NO. : 5,835,463
DATED : November 10, 1998
INVENTOR(S) : Kazuhiro TESHIROGI et al.

It is certified that error appears in the above-indentified patent and that said Letters Patent is hereby corrected as shown below:

At column 13, line 55 (claim 4, line 4) of the printed patent, change "contact" to ---constant---.

At column 13, line 61 (claim 5, line 4) of the printed patent, change "CLV" to ---constant linear velocity---.

At column 13, line 63 (claim 5, line 6) of the printed patent, change "CLV" to ---constant linear velocity---.

Signed and Sealed this

Seventh Day of December, 1999

*Attest:*

Q. TODD DICKINSON

*Attesting Officer*     *Acting Commissioner of Patents and Trademarks*